United States Patent [19]
George et al.

[11] Patent Number: 5,378,796
[45] Date of Patent: Jan. 3, 1995

[54] PROCESS FOR PREPARING COPOLYESTERS

[75] Inventors: Scott E. George; Douglas C. Hoffman, both of Kingsport, Tenn.

[73] Assignee: Eastman Chemical Company, Kingsport, Tenn.

[21] Appl. No.: 194,368

[22] Filed: Feb. 9, 1994

[51] Int. Cl.$^6$ ............................................. C08G 63/82
[52] U.S. Cl. ................................ 528/279; 528/272; 528/282; 528/283; 528/307; 528/308; 528/308.6; 525/437
[58] Field of Search ............... 528/272, 279, 282, 283, 528/307, 308, 308.6; 525/437

[56] References Cited

U.S. PATENT DOCUMENTS

| | | |
|---|---|---|
| 2,578,660 | 12/1951 | Auspos et al. |
| 3,074,913 | 1/1963 | Davies et al. |
| 3,377,320 | 4/1968 | Zoetbrood |
| 3,988,301 | 10/1974 | Jeurissen et al. ............ 528/274 |
| 4,940,772 | 7/1990 | Matsumoto et al. ......... 528/272 |
| 5,095,089 | 3/1992 | Mori et al. .................. 528/272 |
| 5,124,435 | 6/1992 | Mori et al. .................. 528/307 |
| 5,185,426 | 2/1993 | Verheijen et al. ........... 528/272 |

*Primary Examiner*—Samuel A. Acquah
*Attorney, Agent, or Firm*—John D. Thallemer; John F. Stevens

[57] ABSTRACT

The present invention relates to a process for preparing copolyesters which involves two steps. The first step is a diol interchange step, and the second step is a polycondensation step. More specifically, the process involves (I) reacting in the presence of a polycondensation catalyst a dihydroxy terephthalate-containing compound having the formula:

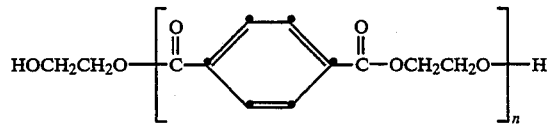

wherein n is 1 to 10 and at least 99% of the endgroups are ethylene glycol moieties; and 0.01 to 10 moles, based on moles of the dihydroxy terephthalate-containing compound, of a diol, and (II) polycondensing the reaction product of Step (I) to form a copolyester while excess diol is removed until desired molecular weight is obtained. This process does not include a transesterification of a dialkyl ester reaction or an esterification reaction which are usually used to produce copolyesters. Moreover, this process allows for polyethylene terephthalate and copolyesters prepared therefrom to be produced on an integrated production line.

15 Claims, No Drawings

PROCESS FOR PREPARING COPOLYESTERS

FIELD OF THE INVENTION

The present invention relates to a process for preparing copolyesters which involves two steps. The first step is a diol interchange step, and the second step is a polycondensation step. More specifically, the process involves (I) reacting in the presence of a polycondensation catalyst a dihydroxy terephthalate-containing compound having the formula:

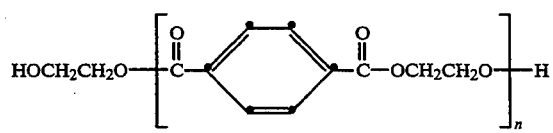

wherein n is 1 to 10 and at least 99% of the endgroups are ethylene glycol moieties; and 0.01 to 10 moles, based on moles of the dihydroxy terephthalate-containing compound, of a diol, and (II) polycondensing the reaction product of Step (I) to form a copolyester while excess diol is removed until desired molecular weight is obtained. This process does not include a transesterification of a dialkyl ester reaction or an esterification reaction which are usually used to produce copolyesters. Moreover, this process allows for polyethylene terephthalate and copolyesters prepared therefrom to be produced on an integrated production line.

BACKGROUND OF THE INVENTION

Copolyesters are widely used as extrusion and injection-molding resins for the fabrication of various articles for household or industrial use, including appliance parts, containers and auto parts. A majority of the copolyesters are composed of polyethylene terephthalate (PET) modified with other diols and/or dicarboxylic acid esters. Copolyesters are usually prepared according to copolyester forming conditions well known in the art. For example, a mixture of one or more aromatic dicarboxylic acids or ester forming derivatives thereof, and one or more diols is heated in the presence of esterification and/or transesterification catalysts at temperatures in the range of about 150° C. to about 250° C., in an inert atmosphere. During the esterification or transesterification reaction, the by-product water or alcohol is removed. Normally, the dicarboxylic acid or dialkyl derivative thereof is esterified or transesterified with the diol(s) at atmospheric pressure and at a temperature at the lower end of the specified range. Polycondensation then is effected by increasing the temperature and lowering the pressure while excess diol is removed from the mixture.

U.S. Pat. Nos. 5,124,435 and 5,095,089 disclose Poly(ethylene/1,4-cyclohexylenedimethylene terephthalate copolyesters (PETG) prepared by an esterification reaction or ester exchange reaction and a polycondensation reaction. Acetates of such metals as Zn, Mn, and Mg were employed as catalysts for the transesterification reaction of dimethylterephthalate (DMT), while oxides of such metals as Sb and Ge were used for the polycondensation of bis-2-hydroxyethyl terephthalate. Additionally, an alkali metal salt such as potassium carbonate or sodium acetate is incorporated into the catalyst formulation as a color stabilizer or masking agent to mask the yellow color generated during processing.

U.S. Pat. Nos. 2,578,660, 3,074,913, and 3,377,320 disclose polyesters prepared using an ester-interchange catalyst and a germanium compound as a polycondensation catalyst. The patents suggest that the use of germanium compounds as polycondensation catalysts produce polyesters which are free from color without deleteriously affecting the rate of polycondensation.

The process of the present invention has eliminated the transesterification of a dialkyl ester reaction and the esterification reaction in the production of copolyesters. Moreover, the copolyesters produced by the process of the present invention are clear and colorless, and thus, do not require the addition of color stabilizers or masking agents.

SUMMARY OF THE INVENTION

Accordingly, it is one object of the present invention to provide a process for preparing copolyesters using only a polycondensation catalyst as the catalyst system.

Another object of the present invention is to provide a process for preparing clear and colorless copolyesters without adding a color stabilizer or masking agent.

These and other objects are accomplished herein by a process for preparing a copolyester, said process comprising the steps of:

(I) reacting in the presence of a polycondensation catalyst under an inert atmosphere at a temperature of 150° C. to 250° C. for 0.01 to 8 hours (A) a dihydroxy terephthalate-containing compound having the formula:

wherein n is 1 to 10 and at least 99% of the endgroups are ethylene glycol moieties; and (B) 0.005 to 10 moles, per mole of the dihydroxy terephthalate-containing compound, of a diol selected from the group consisting of cycloaliphatic diols having 6 to 20 carbon atoms, aliphatic diols having 2 to 20 carbon atoms and combinations thereof; and (II) polycondensing the reaction product of Step (I) to form a copolyester at a temperature in the range of 175° C. to 325° C. under reduced pressure while excess diol is removed until desired molecular weight is obtained.

DESCRIPTION OF THE INVENTION

The process of the present invention involves two steps: 1) a diol interchange step, and 2) a polycondensation step. The first step involves adding a dihydroxy terephthalate-containing compound, component (A), to a diol, Component (B), in the presence of a polycondensation catalyst. The dihydroxy terephthalate-containing compound has the formula:

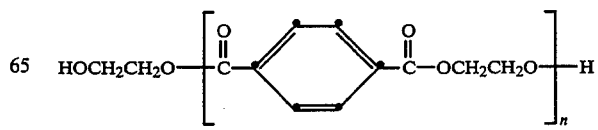

In the dihydroxy terephthalate-containing compound, n is 1 to 10, preferably, n is 1 to 5. More preferably, n is 1 and the dihydroxy terephthalate-containing compound is bis-2-hydroxyethyl terephthalate (BHET). Examples of higher order oligomeric dihydroxy terephthalate-containing compounds include:

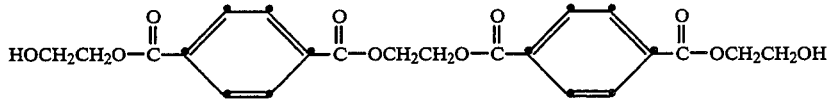

and

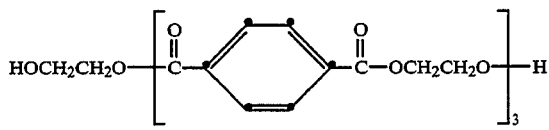

It is important to note that any type of oligomeric species must have greater than 99% of the total end-groups as ethylene glycol moieties. The dihydroxy terephthalate-containing compound can be a blend of monomer, dimer, trimer, etc. Non-functional ester or free-acid end groups will serve to limit the molecular weight of the resulting copolyester. Non-functional methyl ester end-groups could be present when the dihydroxy terephthalate-containing compound is manufactured from a DMT/EG feed and free-acid end-groups could result from a TPA/EG feed. A dihydroxy terephthalate-containing compound from either process is suitable for this process, however, it is a requirement that less than 1%, preferably less than 0.1% of the total end groups can be non-hydroxyl-bearing ester or free-acid. The dihydroxy terephthalate-containing compound may contain residual catalyst, although a catalyst-free material is preferred.

Component (B) is a diol including cycloaliphatic diols having 6 to 2C carbon atoms, aliphatic diols having 2 to 20 carbon atoms or combinations thereof. Examples of such diols are: ethylene glycol, diethylene glycol, triethylene glycol, polyethylene glycol, 1,4-cyclohexanedimethanol, 2,2,4,4-tetramethyl-1,3-cyclobutanediol, propane-1,3-diol, butane-1,4-diol, pentane-1,5-diol, hexane-1,6-diol, 2,2-dimethyl-1,3-propanediol, 1,10-decanediol, 2,2,4,4-tetramethyl-1,3-cyclobutanediol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxy-phenyl)-propane. The copolyester may be prepared from one or more of the above diols.

Preferably, the diol is 1,4-cyclohexanedimethanol (CHDM) or 2,2,4,4-tetramethyl-1,3-cyclobutanediol (TMCBD). More preferably, the diol is 1,4-cyclohexanedimethanol- The cis and trans isomeric ratio of 1,4-cyclohexanedimethanol is not an important consideration for the process of this invention. It is to be recognized that certain diol combinations may be excluded due to physical and chemical process limitations. For example, a diol that has a boiling point below the minimum diol interchange temperature or a diol that is poorly reactive to the diol interchange process.

The amount of diol added in the diol interchange step, Step (I), to yield a specific amount of said diol in the copolymer is highly dependent on the overall process conditions, such as reaction times, temperatures, catalyst type and level, and monomer distribution. At lower levels of diol incorporation, the same ratio of diol in the copolyester as was initially added in the feed can be obtained with a very short diol interchange time. At higher levels of diol incorporation, it is necessary to factor an increasing molar excess into the feed mix or lengthen the diol interchange time/temperature or a combination of both to achieve a particular copolyester composition. A specific diol will have a particular interchange reaction profile. For example, 1,4-cyclohexane-dimethanol can be nearly quantitatively incorporated into a copolyester at molar substitution levels less than 50 mole %, while! 2,2,4,4-tetramethyl-1,3-cyclobutanediol is incorporated at less than 66% of added diol at molar substitution levels up to 50 mole %.

The diol interchange step, Step (I), is conducted in the presence of a polycondensation catalyst under an inert atmosphere at a temperature of 150° C. to 250° C. for 0.01 to 8 hours, preferably 180° C. to 230° C. for 0.1 to 4 hours. The molar amount of added diol in the feed, based on moles of the terephthalate-containing compound, may be varied from 0.005 to 10, preferably 0.005 to 3. Stirring or appropriate conditions are employed to ensure sufficient heat transfer and surface renewal for the reaction mixture.

Polycondensation catalysts and the amounts used in polycondensation reactions are known in the art. Preferably, for the process of the present invention, 25 to 500 ppm of a polycondensation catalyst is used. More preferably, 50 to 300 ppm. Examples of polycondensation catalysts useful in the process of the present invention include: suitable germanium compounds, suitable tin compounds, suitable gallium compounds, suitable titanium compounds, and suitable antimony compounds. Although a large number of catalysts could facilitate both steps of the reaction, germanium compounds are most preferred since germanium compounds yield copolyesters of high molecular weight, low color, and good clarity. A variety of tetravalent germanium species are suitable, however, germanium(IV)-oxide is preferred. The concentration of germanium metal may vary from 25 to 500 ppm, preferably 50 to 300 ppm. Addition of the polycondensation catalyst to the reaction mixture may be as a solution or neat. For example, it is convenient to employ a solution of the germanium compound in ethylene glycol.

Step II of the present invention is a polycondensation step which is performed under reduced pressure at a temperature of 175° C. to 325° C., preferably 250° C. to 300° C., and more preferably 270° C. to 290° C. for 0.1 to 6 hours, preferably 0.25 to 2 hours. Stirring or appropriate conditions are employed to ensure sufficient heat transfer and surface renewal for the reaction mixture.

Semi-crystalline and amorphous copolyesters are within the scope of the present invention. If the copolyester is semi-crystalline then the copolyester may optionally be post reacted in the solid state by heating the solid copolyester to a temperature below the melting temperature of the copolyester in a vacuum or in a stream of inert gas.

It is to be understood that the copolyesters of this invention contain substantially equal molar proportions of acid equivalents (100 mole %) to hydroxy equivalents (100 mole %). Thus, the copolyesters will have a total of acid and hydroxyl equivalents equal to 200 mole percent. The copolyesters have an inherent viscosity of 0.4 to 1.2 dl/g. Preferably, the copolyesters have an inherent viscosity of 0.5 to 1.0 dl/g.

The copolyesters produced by the process of the present invention serve as excellent starting materials for the production of moldings of all types by compression, extrusion or injection molding. Specific applications include various packaging applications such as thermoformed or injection molded trays, lids and cups; injection stretch blow-molded bottles, film and sheet; extrusion blow-molded bottles and multilayer articles. Examples of package contents include, but are not limited to, food, beverages, and cosmetics.

Many other ingredients can used in the process of the present invention to enhance the performance properties of the copolyesters. For example, crystallization aids, impact modifiers, surface lubricants, denesting agents, stabilizers, antioxidants, ultraviolet light absorbing agents, metal deactivators, colorants such as titanium dioxide and carbon black, nucleating agents such as polyethylene and polypropylene, phosphate stabilizers, fillers, and the like, can be included herein. All of these additives and the use thereof are well known in the art.

The materials and testing procedures used for the results shown herein are as follows:

Color was determined according to ASTM D2244 using a Hunter Color Lab instrument. Color analysis measurements are reported as Rd, a and b.

Glass transition temperature (Tg) was determined using a differential scanning calorimeter (DSC).

Inherent viscosity (I.V.) was measured at 23° C. using 0.50 grams of polymer per 100 ml of a solvent consisting of 60% by weight phenol and 40% by weight tetrachloroethane.

The process of the present invention will be further illustrated by a consideration of the following examples, which are intended to be exemplary of the invention. All parts and percentages in the examples are on a weight basis unless otherwise stated.

EXAMPLE I

Preparation of Copolyester Containing 38 Mole% CHDM

A 500 mL flask equipped with a head having a nitrogen inlet, a sidearm to allow removal of volatile materials, and a stirrer shaft inserted through a socket joint was charged with 127 grams (0.5 moles) of BHET, 43.2 grams (0.3 moles) CHDM, and 300 ppm (by weight as the element based on grams of recovered polymer) of germanium in the form of germanium dioxide. The reactants were purged with nitrogen and the flask was immersed in a Belmont metal bath preheated to 210° C. for one hour with stirring under a gentle sweep of inert gas. The temperature of the bath was raised to 285° C. and the inert purge was replaced with a vacuum of 0.5 mm Of Hg. After 180 minutes under reduced pressure, the viscosity of the polymer melt prevented any further increase in molecular weight and reaction was terminated. The flask was removed from the metal bath and the vacuum was replaced with nitrogen. Upon cooling to room temperature, the polymer was removed from the flask and ground to pass a 3 mm screen.

Analysis indicated that the diol component of the polymer consisted of approximately 38 mole % CHDM, 59 mole % EG, and 3 mole % diethylene glycol (DEG). The inherent viscosity was determined to be 0.80 dl/g. A second run heating cycle Tg of 83° C. was recorded by DSC. Color analysis yielded the following average values: Rd=88.0, a=0.85, and b=7.52.

EXAMPLE II

Preparation of Copolyester Containing 55 mole % CHDM

The apparatus and procedure set forth in Example I was used. The following amounts of reactants were initially charged to the flask: 127 grams (0.5 moles) BHET, 43.2 grams (0.3 moles) CHDM, and 4.76 mL of a 0.96% (w/v) solution of dibutyltin diacetate in n-butanol. The diol interchange step, Step I, was conducted at 210° C. for one hour, followed by the polycondensation or polymerization stage, Step II, which was performed at 0.7 mm of Hg for 25 minutes at 285° C. The diol composition consisted of 55 mole % CHDM, 44 mole % EG, and 1 mole % DEG.

The inherent viscosity was determined to be 0.77 dl/g and a second run Tg of 86° C. was recorded. The polymer had a yellow appearance.

EXAMPLE III

Preparation of Copolyester Containing 32 mole % CHDM

This example shows that germanium is not an effective catalyst for a conventional DMT-based route to a PETG copolyester.

The apparatus and procedure set forth in Example I was used. The following amounts of reactants were initially charged to the flask: 97 grams (0.5 moles) DMT, 56 grams (0.90 moles) EG, 22.4 grams (0.16 moles) CHDM, and 6.17 mL of a 0.53% (w/v) solution of germanium oxide in EG. Transesterification was conducted for one hour at 210° C. and one hour at 230° C. under a nitrogen purge. The temperature was raised to 275° C. and a vacuum was applied. After 50 minutes nearly all of the reactor contents had distilled over into the receiver which indicated no molecular weight increase, and thus, no reaction had occurred.

EXAMPLE IV

Preparation of Copolyester Containing 24 mole % TMCBD

This example shows the effectiveness of the disclosed process as a means of producing high molecular weight copolyesters using essentially unreactive diols having secondary hydroxyl groups.

The apparatus and procedure set forth in Example I was used. The following amounts of reactants were initially charged to the flask: 127 grams (0.5 moles)

BHET, 25.2 grams (0.175 moles) TMCBD, and 350 ppm tin in the form of dibutyltin dilaurate. The diol interchange reaction, Step I, was conducted at 210° C. for two hours and at 225° C. for two hours. The temperature was increased to 250° C. and a vacuum of 0.5 mm was applied. Over the course of 30 minutes the temperature was raised to 270° C. and held for an additional 60 minutes. The total time under vacuum was 100 minutes.

NMR analysis revealed the diol composition to be 75 mole % EG, 24 mole % TMCBD, and 1 mole % DEG. The inherent viscosity was determined to be 0.78 dl/g and a second run Tg of 97° C. was recorded.

EXAMPLE V

Preparation of Copolyester Containing 33 mole % CHDM

The apparatus and procedure set forth in Example I was used. The following amounts of reactants were initially charged to the flask: 127 grams (0.5 moles) BHET, 25.2 grams (0.175 moles) CHDM, and 300 ppm, by weight as the element based on grams of theoretical polymer yield, of germanium in the form of germanium dioxide. The diol interchange step, Step I, was conducted at 210° C for two hours, followed by the polycondensation or polymerization stage, Step II, which was performed at less than 0.5 mm of Hg for 90 minutes at 280° C. The diol composition consisted of 33 mole % CHDM, 65 mole % EG, and 2 mole % DEG.

The inherent viscosity was determined to be 0.81 dl/g and a second run Tg of 80° C was determined by DSC. The polymer was colorless and had high clarity. Color analysis yielded the following average values: Rd =67.2, a =−0.88, and b =5.22.

EXAMPLE VI

Preparation of Copolyester Containing 33 mole % CHDM

The apparatus and procedure set forth in Example I was used. The following amounts of reactants were initially charged to the flask: 127 grams (0.5 moles) BHET, 25.2 grams (0.175 moles) CHDM, and 100 ppm of titanium. The diol interchange step, Step I, was conducted at 210° C. for two hours, followed by the polycondensation or polymerization stage, Step II, which was performed at less than 0.5 mm of Hg for 2 hours at 280° C. The diol composition consisted of 33 mole % CHDM, 65 mole % EG, and 2 mole % DEG.

The inherent viscosity was determined to be 0.92 dl/g and a second run Tg of 81° C. was determined by DSC. The polymer had a yellow color. Color analysis yielded the following average values: Rd=75.7, a=1.82, and b=18.16.

The color analysis results from Example V indicate that the use of a qermanium compound as the polycondensation catalyst in the process of the present invention where 1,4-cyclohexanedimethanol is used as the diol, component (B), produces a colorless copolyester. The color analysis results from Example VI indicate that the use of a titanium compound as the polycondensation catalyst where 1,4-cyclohexanedimethanol is used as the diol, produces a yellow copolyester. It is important to note that the level of whiteness or Rd value for Examples V and VI are about the same, however, the measure of tint or the a and b values for Example V is much closer to zero than the a and b values of Example VI.

Many variations will suggest themselves to those skilled in this art in light of the above detailed description. All such obvious modifications are within the full intended scope of the appended claims.

What is claimed is:

1. A process for preparing a copolyester, said process consisting essentially of the steps of:
   (I) reacting in the presence of 25 ppm to 500 ppm of a polycondensation catalyst selected from the group consisting of germanium compounds, tin compounds, gallium compounds, and titanium compounds under an inert atmosphere at a temperature of 150° C. to 250° C. for 0.01 to 8 hours
      (A) a dihydroxy terephthalate compound having the formula:

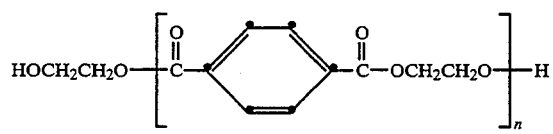

wherein n is 1 to 10 and at least 99% of the endgroups are ethylene glycol moieties; and
      (B) 0.005 to 10 moles, per mole of the dihydroxy terephthalate compound, of a diol selected from the group consisting of cycloaliphatic diols having 6 to 20 carbon atoms, aliphatic diols having 2 to 20 carbon atoms and combinations thereof; and
   (II) polycondensing the reaction product of Step (I) to form a copolyester at a temperature in the range of 175° C. to 325° C. under reduced pressure while excess diol is removed for 0.1 to 6 hours.

2. A process for preparing a copolyester, said process comprising the steps of:
   (I) reacting in the presence of 50 to 300 ppm of a germanium compound under an inert atmosphere at a temperature of 180° C. to 230° C. for 0.1 to 4 hours
      (A) bis-2-hydroxyethyl terephthalate; and
      (B) 0.005 to 3 moles, per mole of bis-2-hydroxyethyl terephthalate, of 1,4-cyclohexanedimethanol; and
   (II) polycondensing the reaction product of Step (I) to form a copolyester at a temperature in the range of 250° C. to 300° C. under reduced pressure while excess diol is removed for 0.1 to 6 hours.

3. A process for preparing a copolyester, said process comprising the steps of:
   (I) reacting in the presence of 50 ppm to 300 ppm of a tin compound under an inert atmosphere at a temperature of 180° C. to 230° C. for 0.1 to 4 hours
      (A) bis-2-hydroxyethyl terephthalate; and
      (B) 0.005 to 3 moles, per mole of bis-2-hydroxyethyl terephthalate, of 2,2,4,4-tetramethyl-1,3-cyclobutanediol; and
   (II) polycondensing the reaction product of Step (I) to form a copolyester at a temperature in the range of 250° C. to 300° C. under reduced pressure while excess diol is removed for 0.1 to 6 hours.

4. The process of claim 1 wherein the dihydroxy terephthalate-containing compound, component (A), is bis-2-hydroxyethyl terephthalate.

5. The process of claim 1 wherein the dihydroxy terephthalate-containing compound, component (A), is a mixture of bis-2-hydroxyethyl terephthalate and a dihydroxy terephthalate-containing compound having the formula:

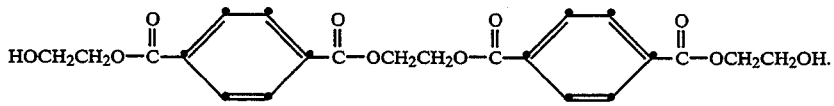

6. The process of claim 1 wherein the dihydroxy terephthalate-containing compound, component (A), is a mixture of bis-2-hydroxyethyl terephthalate and a dihydroxy terephthalate-containing compound having the formula:

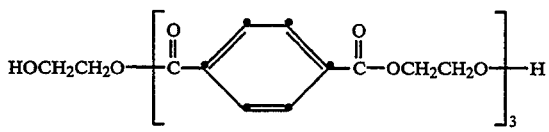

7. The process of claim 1 wherein the diol, component (B), is selected from the group consisting of 1,4-cyclohexanedimethanol, 2,2,4,4-tetramethyl-1,3-cyclobutanediol, diethylene glycol, triethylene glycol, ethylene glycol, polyethylene glycol, propanediol, butanediol, pentanediol, hexanediol and mixtures thereof.

8. The process of claim 7 wherein the diol, component (B), is 1,4-cyclohexanedimethanol.

9. The process of claim 7 wherein the diol, component (B), is 2,2,4,4-tetramethyl-1,3-cyclobutanediol.

10. The process of claim 1 wherein the amount of diol, component (B), which is reacted with the dihydroxy terephthalate-containing compound, component (A), is 0.005 to 3 moles, based on moles of the dihydroxy terephthalate-containing compound.

11. The process of claim 1 wherein Step (II) is carried out at a temperature of 270° C. to 290° C. for 0.25 to 2 hours.

12. The process of claim 1 wherein the polycondensation catalyst is selected from the group consisting of germanium compounds and tin compounds.

13. The process of claim 12 wherein the polycondensation catalyst is germanium(IV)-oxide.

14. The process of claim 1 wherein the copolyester is polyethylene-co-1,4-cyclohexanedimethanol terephthalate.

15. The process of claim 1 wherein the copolyester is polyethylene-co-2,2,4,4-tetramethyl-1,3-cyclobutanediol terephthalate.

* * * * *